(12) United States Patent
Banavali et al.

(10) Patent No.: US 7,563,934 B2
(45) Date of Patent: Jul. 21, 2009

(54) PREPARATION OF $M_nB_{12}H_{12}$

(75) Inventors: Rajiv Manohar Banavali, Rydal, PA (US); Randall Wayne Stephens, Perkasie, PA (US); John Hiroshi Yamamoto, New Britain, PA (US)

(73) Assignee: Rohn and Haas Company, Philadelphia, PA (US)

( * ) Notice: Subject to any disclaimer, the term of this patent is extended or adjusted under 35 U.S.C. 154(b) by 0 days.

(21) Appl. No.: 12/290,759

(22) Filed: Nov. 3, 2008

(65) Prior Publication Data

US 2009/0118526 A1    May 7, 2009

Related U.S. Application Data

(60) Provisional application No. 61/001,868, filed on Nov. 5, 2007.

(51) Int. Cl.
*C07F 9/02* (2006.01)
*C07F 5/02* (2006.01)

(52) U.S. Cl. .................................. 568/4; 568/5; 556/8

(58) Field of Classification Search .............. 568/4, 568/5; 556/8
See application file for complete search history.

(56) References Cited

U.S. PATENT DOCUMENTS 3,328,422 A * 6/1967 Knoth, Jr. ................... 548/405
3,551,120 A   12/1970 Miller et al.
3,961,017 A * 6/1976 Hough et al. ............... 423/286

OTHER PUBLICATIONS

Miller, et al., "Chemistry of Boranes. XX. Syntheses of Polyhedral", J. Inorganic Chem., pp. 1456-1463, vol. 3, No. 10 (1964).
Miller, et al., "Synthesis of Polyhedral Boranes", J. Am. Chem. Soc., pp. 3885-3886, vol. 85, No. 23 (1963).

* cited by examiner

*Primary Examiner*—Porfirio Nazario Gonzalez
(74) *Attorney, Agent, or Firm*—Kenneth Crimaldi

(57) ABSTRACT

A method for producing $M_nB_{12}H_{12}$, wherein M is a metal or ammonium cation and n is one or two, by combining a metal borohydride and $XBH_3$; wherein X is a substituted amine; a substituted phosphine; or tetrahydrofuran.

10 Claims, No Drawings

PREPARATION OF $M_nB_{12}H_{12}$

This application claims the benefit of priority under 35 U.S.C. §119(e) of U.S. Provisional Patent Application No. 61/001,868 filed on Nov. 5, 2007.

BACKGROUND

This invention relates generally to a method for preparing $M_nB_{12}H_{12}$, wherein M is a metal.

Processes for production of $Na_2B_{12}H_{12}$ from sodium borohydride and diethylsulfide-borane complex according to the following equation

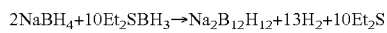
$$2NaBH_4 + 10Et_2SBH_3 \rightarrow Na_2B_{12}H_{12} + 13H_2 + 10Et_2S$$

are known, but they are inefficient in that diethylsulfide-borane complex is unstable in water and must be prepared in anhydrous solvent. For example, H. C. Miller, N. E. Miller, and E. L. Muetterties J. Am. Chem. Soc. 1964, 83, 3885-3886 describes production of $Na_2B_{12}H_{12}$ from sodium borohydride and diethylsulfide-borane complex at 120° C.

The problem addressed by this invention is to provide a more efficient process for producing $M_nB_{12}H_{12}$.

STATEMENT OF INVENTION

The present invention is directed to a method for producing $M_nB_{12}H_{12}$, wherein M is a metal or ammonium cation and n is one or two. The method comprises combining a metal borohydride and $XBH_3$; wherein X is an amine containing at least one aryl group, aralkyl group or branched alkyl group; a phosphine having three aryl, aralkyl or branched alkyl groups; or tetrahydrofuran.

DETAILED DESCRIPTION

Unless otherwise specified, all percentages herein are stated as weight percentages ("wt %") and temperatures are in ° C.

An "aralkyl" group is an alkyl group substituted by at least one aryl group, e.g., benzyl, phenylethyl, etc. An "alkyl" group is a saturated hydrocarbyl group having from one to thirty carbon atoms, and may be linear, branched or cyclic. In some embodiments, alkyl groups have from one to twenty-two carbon atoms. An "aryl" group is a substituent derived from an aromatic hydrocarbon compound. An aryl group has a total of from six to twenty ring atoms, and has one or more rings which are separate or fused, and may be substituted by alkyl or halo groups.

In embodiments of the invention in which X is an amine containing at least one aryl group, aralkyl group or branched alkyl group, the amine nitrogen is substituted with at least one of said groups, with the remaining substituents being additional groups of the same types, linear alkyl groups, especially $C_1$-$C_4$ alkyl groups, hydrogen atoms or a combination thereof. In some embodiments, the amine contains only one aryl or aralkyl group. When the branched alkyl group is a tertiary alkyl group, preferably the other substituents on nitrogen are hydrogen atoms, methyl groups or ethyl groups. When the substituents other than the tertiary alkyl group are hydrogen atoms, the amine is a tertiary-alkyl primary amine, preferably one having at least eight carbon atoms. Examples of such tertiary-alkyl primary amines are the PRIMENE™ amines available from Rohm and Haas Company; Philadelphia, Pa. For example, an isomeric mixture of $C_{16}$ to $C_{22}$ tertiary alkyl primary amines (PRIMENE JM-T); an isomeric mixture of $C_8$ to $C_{10}$ tertiary alkyl primary amines (PRIMENE BC-9); an isomeric mixture of $C_{10}$ to $C_{15}$ tertiary alkyl primary amines (PRIMENE 81-R); or mixtures thereof. In some embodiments in which the branched alkyl group is a primary or secondary alkyl group, the amine has three branched alkyl groups, e.g., tri-isobutylamine and tri-isopropylamine. Preferably, the branched alkyl group has at least four carbon atoms. In some embodiments, the amine has one branched alkyl group and two methyl or ethyl groups. In some embodiments, the amine is a diamine in which each amino group contains at least one aryl group, aralkyl group or branched alkyl group. An example of such an amine is PRIMENE MD amine, available from Rohm and Haas Company; Philadelphia, Pa. In some embodiments, the amine has at least one aryl group selected from phenyl, tolyl, 1-naphthyl and 2-naphthyl. When an aryl group is present on the amine, preferably the other groups are hydrogen, methyl or ethyl.

In embodiments in which X is a phosphine having three aryl, aralkyl or branched alkyl groups, preferably the three groups are the same. Examples of suitable aryl groups include phenyl and tolyl. Preferably, branched alkyl groups have at least four carbon atoms.

In some embodiments of the invention, the amount of amine-borane complex, $XBH_3$ used is at least 0.995 equivalents with respect to the amount of metal borohydride, $MBH_4$. The amine-borane complex may be used as the solvent, in which case there will be a very large excess of the amine-borane complex. In some embodiments of the invention in which the amine-borane complex is not used as the solvent, the amount of the complex is from 0.995 to 10 equivalents, alternatively no more than 5 equivalents, alternatively no more than 2 equivalents, alternatively no more than 1.5 equivalents, alternatively no more than 1.1 equivalents. An equation describing the reaction which occurs in the method of this invention, for the case where M is monovalent (n=1), is as follows:

$$2MBH_4 + 10XBH_3 \rightarrow M_2B_{12}H_{12} + 13H_2 + 10X$$

Preferably, the reaction temperature is from 70° C. to 220° C., alternatively from 100° C. to 195° C.

In some embodiments of the invention, glyme solvents are used, e.g. ethylene glycol dimethyl ether, diethylene glycol dimethyl ether, triethylene glycol dimethyl ether, tetraethylene glycol dimethyl ether.

In some embodiments of the invention, M is an alkali metal, alkaline earth metal, ammonium or substituted ammonium; alternatively M is sodium, potassium, tetramethyl ammonium, tetraethyl ammonium, calcium, lithium or magnesium; alternatively M is sodium. For univalent metals, n=2 and for divalent metals, n=1.

The invention claimed is:

1. A method for producing $M_nB_{12}H_{12}$, wherein M is a metal or ammonium cation and n is one or two; said method comprising combining a metal borohydride and $XBH_3$; wherein X is an amine containing at least one aryl group, aralkyl group or branched alkyl group; a phosphine having three aryl, aralkyl or branched alkyl groups; or tetrahydrofuran.

2. The method of claim 1 in which X is an amine.

3. The method of claim 2 in which said at least one aryl group, aralkyl group or branched alkyl group is at least one branched alkyl group.

4. The method of claim 3 in which said at least one branched alkyl group is a tertiary alkyl group having at least eight carbon atoms.

5. The method of claim 4 in which other amine substituents are hydrogen atoms.

6. The method of claim 5 in which M is sodium and n is two.

7. The method of claim 1 in which X is a phosphine.

8. The method of claim 7 in which the phosphine contains three aryl groups.

9. The method of claim 8 in which the aryl groups are selected from the group consisting of phenyl and tolyl.

10. The method of claim 9 in which M is sodium and n is two.

* * * * *